United States Patent

Tomiyama et al.

(10) Patent No.: US 9,580,100 B2
(45) Date of Patent: Feb. 28, 2017

(54) STEERING SYSTEM

(71) Applicant: JTEKT CORPORATION, Osaka-shi, Osaka (JP)

(72) Inventors: Hiromitsu Tomiyama, Kashihara (JP); Atsumune Nagatani, Kashihara (JP); Hidenobu Tanaka, Shiki-gun (JP); Masayuki Nagaoka, Kashiba (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/943,616

(22) Filed: Nov. 17, 2015

(65) Prior Publication Data

US 2016/0144886 A1 May 26, 2016

(30) Foreign Application Priority Data

Nov. 25, 2014 (JP) .................. 2014-238086

(51) Int. Cl.
*B62D 1/184* (2006.01)
*B62D 1/187* (2006.01)

(52) U.S. Cl.
CPC .............. *B62D 1/187* (2013.01); *B62D 1/184* (2013.01)

(58) Field of Classification Search
CPC ......... B62D 1/184; B62D 1/187; B62D 1/189
See application file for complete search history.

(56) References Cited

U.S. PATENT DOCUMENTS

| 5,743,150 A * | 4/1998 | Fevre | B62D 1/184 |
| | | | 280/775 |
| 5,787,759 A * | 8/1998 | Olgren | B62D 1/184 |
| | | | 280/777 |
| 6,092,955 A * | 7/2000 | Chartrain | B62D 1/184 |
| | | | 403/104 |
| 6,092,957 A * | 7/2000 | Fevre | B62D 1/184 |
| | | | 280/775 |
| 2008/0202276 A1* | 8/2008 | Harris | B62D 1/187 |
| | | | 74/493 |
| 2009/0013817 A1 | 1/2009 | Schnitzer et al. | |
| 2011/0041642 A1* | 2/2011 | Havlicek | B62D 1/184 |
| | | | 74/493 |
| 2015/0048608 A1 | 2/2015 | Morinaga et al. | |

(Continued)

FOREIGN PATENT DOCUMENTS

| CZ | WO 2009047516 A1 * | 4/2009 | ............ B62D 1/184 |
| DE | EP 1043209 A2 * | 10/2000 | ............ B62D 1/184 |

(Continued)

OTHER PUBLICATIONS

Apr. 19, 2016 Extended European Search Report issued in European Patent Application No. 15195780.0.

*Primary Examiner* — Ruth Ilan
(74) *Attorney, Agent, or Firm* — Oliff PLC

(57) ABSTRACT

A steering system includes an upper bracket having a first tooth row, a rigid tooth member, a second tooth row provided on the tooth member, a first moving member, and an elastic member disposed between the tooth member and the first moving member. The first tooth row includes a plurality of first teeth. The second tooth row includes a plurality of second teeth. The elastic member exerts a constant restoration force. The second tooth row meshes with the first tooth row when the first teeth and the second teeth are alternately arranged in a tilt direction.

4 Claims, 13 Drawing Sheets

(56) References Cited

U.S. PATENT DOCUMENTS

2015/0053041 A1 2/2015 Schnitzer et al.
2016/0144885 A1* 5/2016 Tanaka .................. B62D 1/187
                                                74/493

FOREIGN PATENT DOCUMENTS

| DE | 10 2010 044 753 A1 | 3/2012 |
| EP | 2 575 319 A1 | 4/2013 |
| EP | 2 576 319 A1 | 4/2013 |
| WO | 2009/068646 A1 | 6/2009 |
| WO | 2013/107486 A1 | 7/2013 |
| WO | 2013/118411 A1 | 8/2013 |

* cited by examiner

FIG.3

STEERING SYSTEM

INCORPORATION BY REFERENCE

The disclosure of Japanese Patent Application No. 2014-238086 filed on Nov. 25, 2014 including the specification, drawings and abstract, is incorporated herein by reference in its entirety.

BACKGROUND OF THE INVENTION

1. Field of the Invention

The invention relates to a steering system.

2. Description of Related Art

A steering column described in US Patent Application Publication No. 2009-0013817 (US 2009/0013817 A) includes an adjustment portion that positions the steering column and a holding portion that does not move in a direction in which the position of the steering column is adjusted (adjustment direction). The holding portion is provided with tooth portions arranged in the adjustment direction. A tooth plate of an elastomer is inserted through a clamp bolt penetrating the adjustment portion and the holding portion. The tooth plate has tooth portions arranged in the adjustment direction.

Operating an operation member attached to the clamp bolt allows a pressing member through which the clamp bolt is inserted to be moved toward the holding portion. Moving the pressing member toward the holding portion causes the tooth plate to be pressed by the pressing member to move toward the holding portion. At this time, the tooth portions of the tooth plate are each placed between the tooth portions of the holding portion to engage the tooth portions of the holding portion with the tooth portions of the tooth plate.

The steering column described in US 2009/0013817 A needs to operate the operation member with a predetermined force (operating force) during locking. When the operation member is locked, unlike the case where the tooth portions of the tooth plate mesh properly with the tooth portions of the holding portion, when the tooth portions of the tooth plate fail to mesh properly with the tooth portions of the holding portion and move onto the tooth portions of the holding portion to deflect the tooth plate, the reaction force of the deflected tooth plate acts on the operation member via the pressing member to increase the operating force. Thus, the operating force exerted on the operation member may vary between the case of the proper meshing between the tooth portions of the tooth plate and the tooth portions of the holding portion and the case of the failure in the proper meshing, which leads to an unstable operating force.

SUMMARY OF THE INVENTION

An object of the present invention is to provide a steering system that allows an operating force exerted on an operation member to be stabilized.

According to an aspect of the present invention, a steering system includes: a column jacket that holds a steering shaft with a steering member coupled to one end of the steering shaft and that is movable in a tilt direction intersecting an axial direction of the steering shaft in an up-down direction in order to position the steering member in the tilt direction; a bracket that has a first tooth row including a plurality of first teeth arranged along the tilt direction, and that is fixed to a vehicle body to support the column jacket; an operation member that is operated for the positioning; a rigid tooth member that is provided adjacent to the bracket in a direction orthogonal to both the axial direction and the tilt direction and that is movable in the tilt direction along with the column jacket and movable in the orthogonal direction; a second tooth row that is provided on a surface of the tooth member facing the first tooth row in the orthogonal direction and that includes a plurality of second teeth arranged along the tilt direction, the second tooth row meshing with the first tooth row when the first teeth and the second teeth are alternately arranged in the tilt direction; a moving member that is disposed on the opposite side of the tooth member from the bracket in the orthogonal direction and that is movable in the orthogonal direction in accordance with an operation of the operation member; and an elastic member disposed between the tooth member and the moving member, and within a predetermined range where the moving member moves toward the bracket, exerting a constant restoration force while being compressed in the orthogonal direction In the steering system according to the aspect, the bracket supporting the column jacket has the first tooth row including the first teeth arranged along the tilt direction intersecting the axial direction of the steering shaft to which the steering member is coupled, in the up-down direction. The tooth member moving in the tilt direction along with the column jacket during positioning of the steering member is provided adjacent to the bracket in the direction orthogonal to both the axial direction of the steering shaft and the tilt direction.

The second tooth row that includes the plurality of second teeth arranged along the tilt direction is provided on the surface of the tooth member facing the first tooth row in the orthogonal direction. The moving member is disposed on the opposite side of the tooth member from the bracket in the orthogonal direction. The elastic member is disposed between the tooth member and the moving member.

While the moving member is moving toward the bracket within the predetermined range in the orthogonal direction in accordance with the operation of the operation member, the elastic member moves the tooth member toward the bracket in the orthogonal direction while being compressed between the tooth member and the moving member. Normally, the first teeth and the second teeth are alternately arranged in the tilt direction to mesh the first tooth row with the second tooth row. Thus, the steering member is locked in a position in the tilt direction. While the moving member is moving within the predetermined range, the elastic member exerts the constant restoration force, which acts on the operation member as a constant reaction force. Therefore, while the moving member is moving within the predetermined range, the operating force exerted to operate the operation member is kept constant.

On the other hand, depending on the position of the column jacket resulting from the positioning of the steering member, the first tooth row and the second tooth row may fail to mesh properly with each other, and the second tooth row moves onto the first tooth row in the orthogonal direction. In this case, the tooth member comes into contact with the bracket earlier than usual, which accordingly increases the degree to which the elastic member is compressed in the orthogonal direction (compression distance). However, even in such a case, the moving member moves within the predetermined range, the elastic member exerts the constant restoration force as is the case with the above-described normal case. Therefore, regardless of whether or not the first tooth row and the second tooth row mesh properly with each other, the operating force exerted on the operation member is kept constant and can be stabilized.

The tooth member is rigid and thus difficult to deflect. Consequently, the operating force exerted on the operation member can be restrained from being varied by a reaction force resulting from the deflection of the tooth member. This also allows the operating force exerted on the operation member to be stabilized.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 3 is a sectional view taken along line in FIG. 1;

DETAILED DESCRIPTION OF EMBODIMENTS

An embodiment of the present invention will be described below in detail with reference to the attached drawings.

Figure 1:
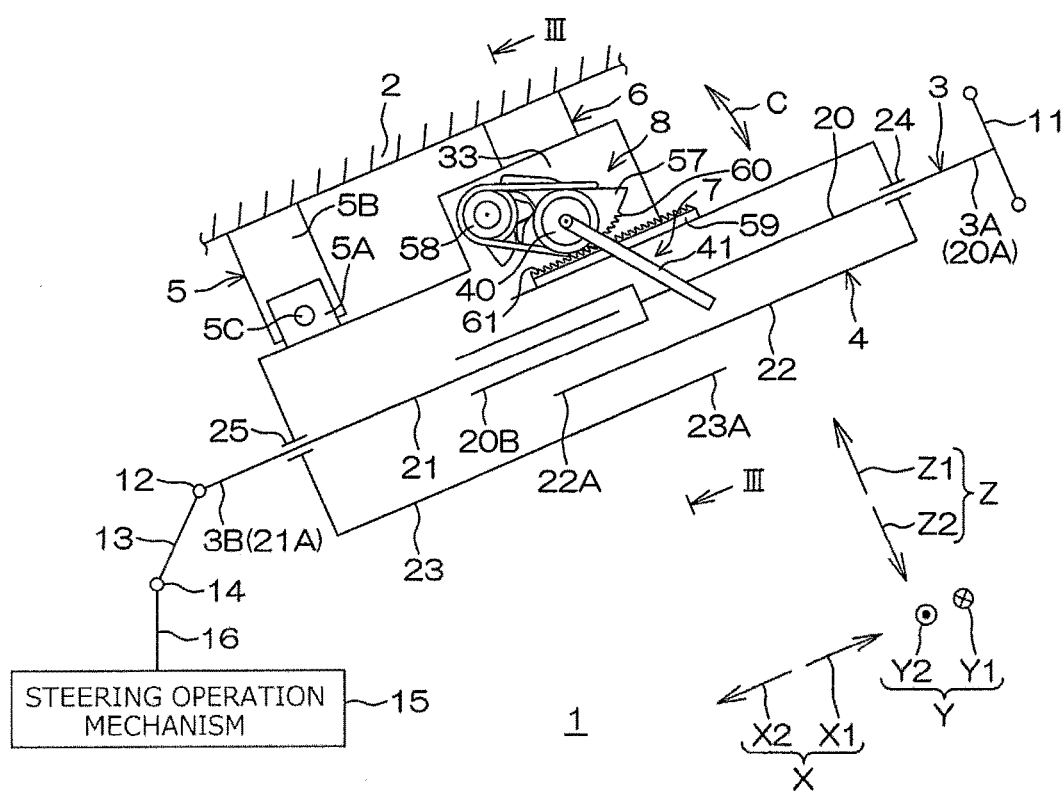
FIG. 1 is a side view depicting a general configuration of a steering system 1 according to an embodiment of the present invention.
Figure 2:
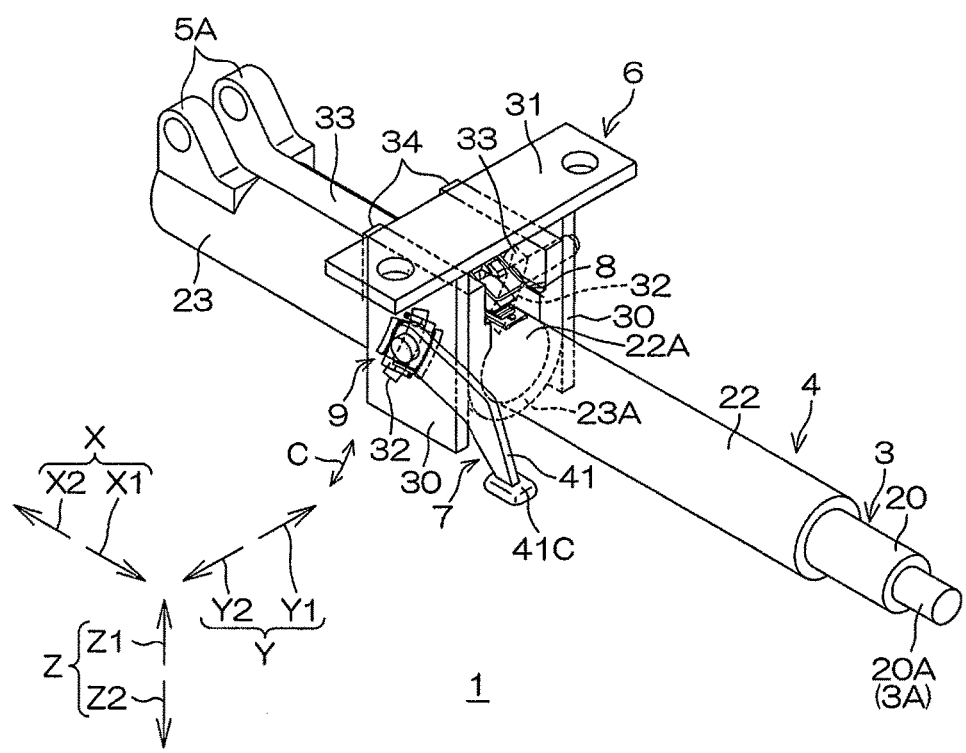
FIG. 2 is a perspective view of the steering system 1.

FIG. 1 is a side view depicting a general configuration of a steering system 1 according to an embodiment of the present invention. In FIG. 1, the left of the drawing plane corresponds to a front of a vehicle body 2 to which the steering system 1 is attached. The right of the drawing plane corresponds to a rear of the vehicle body 2. The upper side of the drawing plane corresponds to an upper side of the vehicle body 2. The lower side of the drawing plane corresponds to a lower side of the vehicle body 2. FIG. 2 is a perspective view of the steering system 1.

As seen in FIG. 1, the steering system 1 mainly includes a steering shaft 3, a column jacket 4, a lower bracket 5, and an upper bracket 6 (bracket), a positioning mechanism 7, a telescopic lock mechanism 8, and a pair of tilt lock mechanisms 9 (see FIG. 2).

A steering member 11 is coupled to a first end 3A of the steering shaft 3 that is a rear end thereof. A second end 3B of the steering shaft 3 that is a front end thereof is coupled to a pinion shaft 16 of a steering operation mechanism 15 via a universal joint 12, an intermediate shaft 13, and a universal joint 14 in order.

The steering operation mechanism 15 includes a rack and pinion mechanism. When rotation of the steering shaft 3 is transferred to the steering operation mechanism 15, the steering operation mechanism 15 steers steered wheels such as tires not depicted in the drawings, in accordance with the rotating distance of the steering shaft 3.

The steering shaft 3 extends in a front-rear direction of the vehicle body 2. A direction in which the steering shaft 3 extends is hereinafter referred to as an axial direction X. The axial direction X is inclined to a horizontal direction such that the second end 3B is lower than the first end 3A. The rear side in the axial direction X is denoted by reference character X1. The front side in the axial direction X is denoted by reference character X2.

Among directions orthogonal to the axial direction X, a direction perpendicular to the drawing plane of FIG. 1 is referred to as a lateral direction Y, and a direction extending generally in an up-down direction in FIG. 1 is referred to as an up-down direction Z. In the lateral direction Y, a side facing away from the viewer in FIG. 1 is a right side Y1, and a side facing the viewer in FIG. 1 is a left side Y2. In the up-down direction Z, an upper side is denoted by reference character Z1, and a lower side is denoted by reference character Z2.

In the figures other than FIG. 1, the same reference characters as those in FIG. 1 are used for directions corresponding to the axial direction X, the rear side X1, the front side X2, the lateral direction Y, the right side Y1, the left side Y2, the up-down direction Z, the upper side Z1, and the lower side Z2.

The steering shaft 3 has an upper shaft 20 that is at least partly cylindrical and a columnar lower shaft 21. The upper shaft 20 is disposed on the rear side X1 with respect to the lower shaft 21 so as to be coaxial with the lower shaft 21.

A rear end 20A of the upper shaft 20 corresponds to the first end 3A of the steering shaft 3. The steering member 11 is coupled to the rear end 20A of the upper shaft 20.

A front end 21A of the lower shaft 21 corresponds to the second end 3B of the steering shaft 3. A rear end of the lower shaft 21 is inserted into a front end 20B of the upper shaft 20 from the front side X2.

The lower shaft 21 is fitted into the upper shaft 20 by spline fitting or serration fitting and coupled to the front end 20B of the upper shaft 20. Thus, the upper shaft 20 and the lower shaft 21 can rotate integrally and move relative to each other along the axial direction X. Movement of the upper shaft 20 with respect to the lower shaft 21 in the axial direction X enables the steering shaft 3 to be extended and contracted in the axial direction X.

The column jacket 4 is generally a hollow member extending in the axial direction X. The column jacket 4 houses and holds the steering shaft 3. The column jacket 4 has an upper jacket 22 and a lower jacket 23 extending in the axial direction X.

The upper jacket 22 is positioned on the rear side X1 with respect to the lower jacket 23. The upper jacket 22 is fitted in the lower jacket 23. Specifically, a front end 22A of the upper jacket 22 is inserted from the rear side X1 into a rear end 23A of the lower jacket 23. In this state, the upper jacket 22 can move with respect to the lower jacket 23 in the axial direction X. This movement enables the column jacket 4 as a whole to be extended and contacted along the axial direction X.

The column jacket 4 is coupled to the steering shaft 3 by a bearing 24 and a bearing 25. Thus, the column jacket 4 supports the steering shaft 3 such that the steering shaft 3 is rotatable.

Specifically, a rear end of the upper jacket 22 is coupled to the upper shaft 20 by the bearing 24. Consequently, the upper jacket 22 supports the upper shaft 20 such that the upper shaft 20 is rotatable. A front end of the lower jacket 23 is coupled to the lower shaft 21 by the bearing 25. Consequently, the lower jacket 23 supports the lower shaft 21 such that the lower shaft 21 is rotatable. Thus, a set of the upper shaft 20 and the upper jacket 22 can move with respect to a set of the lower shaft 21 and the lower jacket 23 in the axial direction X. This enables the column jacket 4 to be extended and contracted along with the steering shaft 3.

In this case, extension and contraction of the steering shaft 3 and the column jacket 4 is referred to as telescopic motion, and adjustment based on the telescopic motion, in other words, the positioning of the steering member 11 in the axial direction X based on the telescopic motion, is referred to as telescopic adjustment.

The lower bracket 5 supports a front side X2 portion of the lower jacket 23 to couple the steering system 1 to the vehicle body 2.

The lower bracket 5 includes a pair of movable brackets 5A (see also FIG. 2) fixed to the lower jacket 23, a fixed bracket 5B fixed to the vehicle body 2, and a central shaft 5C extending in the lateral direction Y.

The movable brackets 5A are pivotally supported by the fixed bracket 5B via the central shaft 5C. Thus, the column jacket 4 as a whole can pivot up and down around the central shaft 5C along with the steering shaft 3. The pivoting in this case is referred to as tilting, and a general up-down direction around the central shaft 5C is referred to as a tilt direction C. The tilt direction intersects the axial direction X in the up-down direction. The tilt direction C is orthogonal to the lateral direction Y. Positioning of the steering member 11 based on the tilting is referred to as tilt adjustment.

The upper bracket 6 supports a rear side X1 portion of the lower jacket 23 to couple the steering system 1 to the vehicle body 2.

As seen in FIG. 2, the upper bracket 6 is shaped like a groove that is open downward and formed laterally symmetrically with respect to the column jacket 4 so as to be generally inverted U-shaped as viewed in the axial direction X. More specifically, the upper bracket 6 integrally includes a pair of side plates 30 and a coupling plate 31. The side plates 30 are thin in the lateral direction Y and are across the column jacket 4 from each other. The coupling plate 31 is coupled to upper ends of the respective side plates 30 and is thin in the up-down direction Z.

In the pair of side plates 30, a tilt groove 32 is formed in each side plate 30 such that the tilt grooves 32 are located at the same position as viewed in the lateral direction Y. The tilt groove 32 extends in the tilt direction C. The coupling plate 31, for example, has portions extending outward from the respective side plates 30 in the lateral direction Y. The upper bracket 6 as a whole is fixed to the vehicle body 2 (see FIG. 1) with for example, bolts inserted through the extending portions and not depicted in the drawings.

In an upper side Z1 portion of the lower jacket 23, a slit 33 is formed which extends all along the lower jacket 23 in the axial direction and penetrates the lower jacket 23 in the up-down direction Z. At the rear end 23A of the lower jacket 23, a pair of support portions 34 is integrally provided which extends in the upper side Z1 direction and defines the slit 33 in the lateral direction Y. Each of the support portions 34 is shaped generally like a rectangular parallelepiped extending in the axial direction X and the up-down direction Z.

Figure 3:
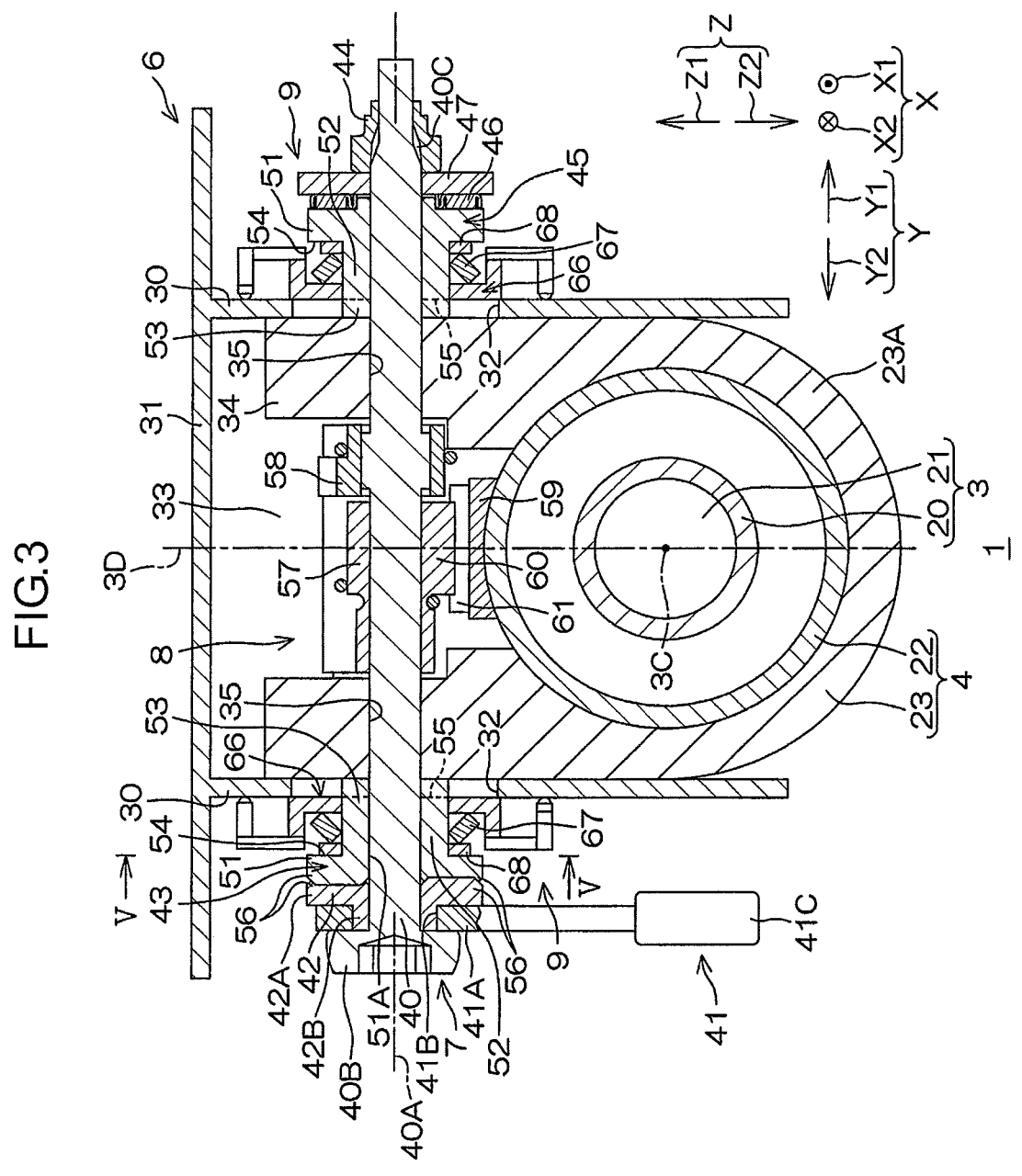

FIG. 3 is a sectional view taken along line in FIG. 1. In FIG. 3, a plane extending in the up-down direction Z through a central axis 3C of the steering shaft 3 is referred to as a reference plane 3D.

As seen in FIG. 3, in each of the support portions 34, a shaft insertion hole 35 is formed which penetrates the corresponding support portion 34. The shaft insertion hole 35 is shaped generally like a circle as viewed in the lateral direction Y. The shaft insertion holes 35 in the support portions 34 are located at the same position as viewed in the lateral direction Y. The shaft insertion holes 35 in the support portions 34 overlap parts of the tilt grooves 32 in the side plates 30 of the upper bracket 6 as viewed in the lateral direction Y.

The positioning mechanism 7 is a mechanism that enables the tilt adjustment and the telescopic adjustment of the steering member 11 (see FIG. 1) and that locks the steering member 11, on which the tilt adjustment and the telescopic adjustment have been executed, in a position.

The positioning mechanism 7 includes a rotating shaft 40, an operation member 41, a cam 42, a first moving member 43, a nut 44, a second moving member 45, a needle roller bearing 46, and a thrust washer 47.

The rotating shaft 40 is made of metal and shaped like a rod having a central axis 40A extending in the lateral direction Y. The rotating shaft 40 is slightly smaller than the shaft insertion holes 35 as viewed in the lateral direction Y. The rotating shaft 40 is inserted through areas where the shaft insertion holes 35 and the tilt grooves 32 overlap as viewed in the lateral direction Y. The rotating shaft 40 can rotate about the central axis 40A in the shaft insertion holes 35 and the tilt grooves 32. The rotating shaft 40 is supported by the side plates 30 of the upper bracket 6. The rotating shaft 40 is positioned on the upper side Z1 with respect to the steering shaft 3.

A left end of the rotating shaft 40 that is a first end thereof is positioned on the left side Y2 with respect to the side plate 30 provided on the left side Y2. A right end of the rotating shaft 40 that is a second end thereof is positioned on the right side Y1 with respect to the side plate 30 of the upper bracket 6 that is provided on the right side Y1.

At the left end of the rotating shaft 40, a head portion 40B is provided which has a larger diameter than the other parts of the rotating shaft 40. In an outer periphery of the right end of the rotating shaft 40, a threaded groove 40C is formed.

The operation member 41 is a lever or the like that can be gripped. In a base end 41A of the operation member 41 that is a first end thereof in a longitudinal direction of the operation member 41, an insertion hole 41B is formed which penetrates the operation member 41 in the lateral direction Y. The rotating shaft 40 is inserted through the insertion hole 41B. A driver can grip a gripping portion 41C of the operation member 41 that is a second end thereof in the longitudinal direction. The rotating shaft 40 is pivoted along with the operation member 41 in accordance with an operation of the operation member 41.

The cam 42 integrally includes an annular plate portion 42A and a tubular boss portion 42B. The annular plate portion 42A is located on the right side Y1 of the base end 41A of the operation member 41 and is adjacent to the base end 41A. The tubular boss portion 42B extends from the plate portion 42A toward the left side Y2. The rotating shaft 40 is inserted through a space defined by inner peripheral surfaces of the plate portion 42A and the boss portion 42B. The boss portion 42B is inserted through the insertion hole 41B in the operation member 41. The cam 42 rotates integrally with the rotating shaft 40.

Figure 4:
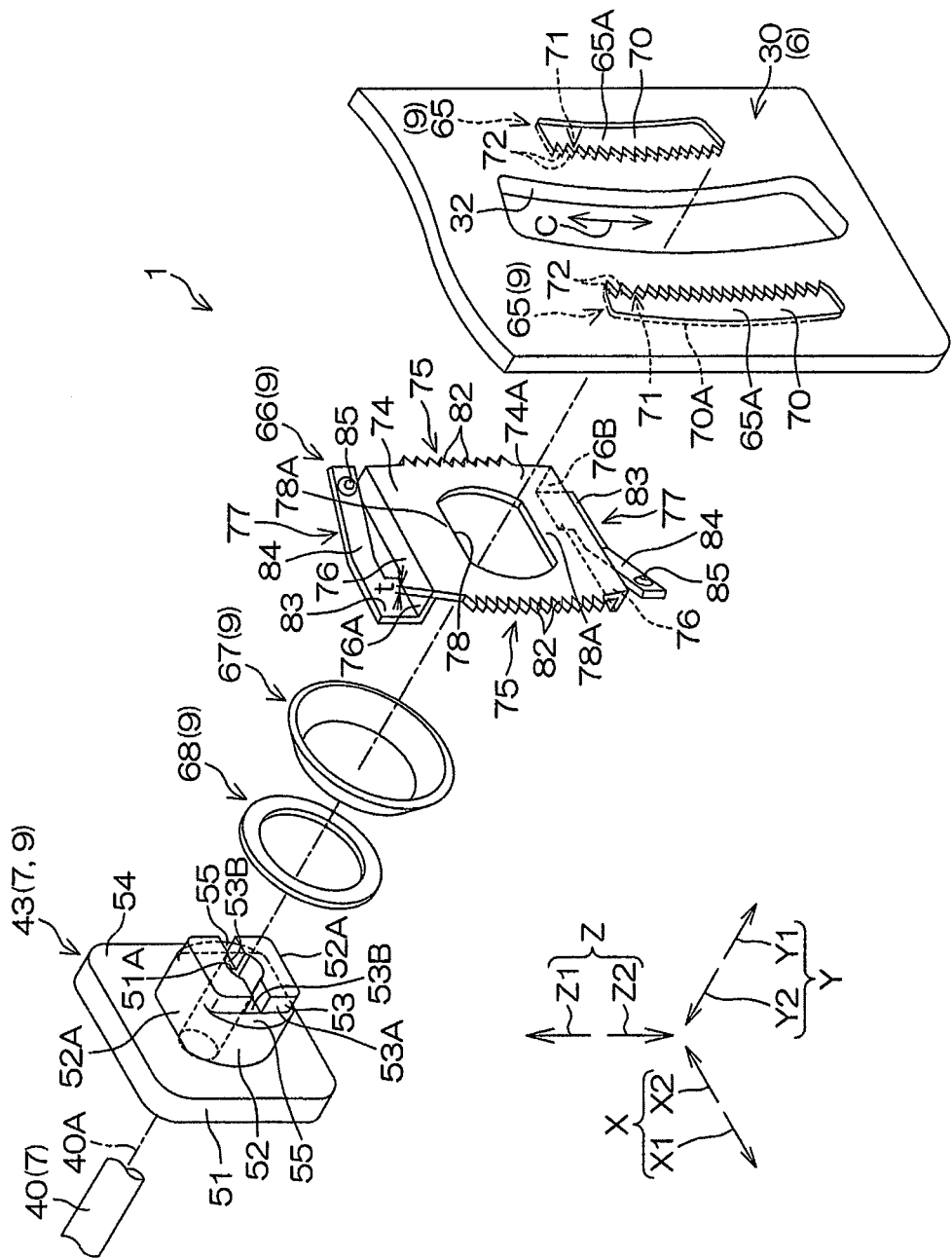
FIG. 4 is an exploded sectional view of a tilt lock mechanism 9 on a left side Y2.

FIG. 4 is an exploded perspective view of the tilt lock mechanism 9 on the left side Y2.

As seen in FIG. 4, the first moving member 43 is, for example, a sintered component, and is shaped generally like a ring as viewed in the lateral direction Y. The first moving member 43 integrally includes a first pressing portion 51, a second pressing portion 52, and a boss portion 53.

The first pressing portion 51 of the first moving member 43 is shaped like a plate that is thin in the lateral direction Y. The first pressing portion 51 is shaped generally like a rectangle as viewed in the lateral direction Y. In the first pressing portion 51, an insertion hole 51A is formed which penetrates the first pressing portion 51 in the lateral direction Y. A right side surface of the first pressing portion 51 is referred to as a first pressing surface 54.

The second pressing portion 52 of the first moving member 43 is shaped like a plate that is thin in the lateral direction Y. The second pressing portion 52 protrudes from the first pressing surface 54 of the first pressing portion 51 toward the right side Y1. The second pressing portion 52 is shaped generally like a circle as viewed from the right side Y1. On both sides of the second pressing portion 52 in the up-down direction, flat surfaces 52A are formed which are parallel to each other and flat along the axial direction X and the lateral direction Y.

A right side surface of the second pressing portion 52 is referred to as a second pressing surface 55. To be exact, the second pressing surface 55 is shaped generally like a semi-circular arc, and two second pressing surfaces 55 are provided such that they are separated from each other in the axial direction X. The second pressing surfaces 55 protrude in the opposite outward directions in the axial direction X. The insertion hole 51A also penetrates the second pressing portion 52 in the lateral direction Y.

The boss portion 53 is shaped generally like a rectangle as viewed in the lateral direction Y and protrudes from an area between the second pressing surfaces 55 toward the right side Y1. Opposite surfaces 53A of the boss portion 53 in the axial direction X extend in the tilt direction C along edges of the tilt groove 32 extending in the tilt direction C. The flat surface 52A of the second pressing portion 52 on the upper side Z1 is flush with an upper end surface of the boss portion 53. The flat surface 52A of the second pressing portion 52 on the lower side Z2 is flush with a lower end surface of the boss portion 53. The upper end surface and the lower end surface of the boss portion 53 are considered to be part of the flat surfaces 52A. The insertion hole 51A in the first pressing portion 51 also penetrates the boss portion 53 in the lateral direction Y. Substantially in the center of the boss portion 53 in the up-down direction Z, a pair of cutouts 53B is formed which is formed by cutting out the boss portion 53 from the right side Y1. The cutouts 53B are separated from each other in the axial direction X. The cutouts 53B communicate with the insertion hole 51A. Thus, the boss portion 53 is divided into two portions, namely, an upper side portion and a lower side portion.

As seen in FIG. 3, the left end of the rotating shaft 40 is inserted through the insertion hole 51A in the first moving member 43. The first moving member 43 is located on the right side Y1 of the cam 42 and is adjacent to the cam 42. On a right side surface of the cam 42 and a left side surface of the first pressing portion 51 of the first moving member 43, cam protrusions 56 are formed. The cam protrusions 56 on the cam 42 can move onto the respective cam protrusions 56 of the first moving member 43.

The boss portion 53 of the first moving member 43 is inserted through the tilt groove 32 on the left side Y2. As described above, the surfaces 53A of the boss portion 53 function as what is called width across flats and extend along the edges of the tilt groove 32 extending in the tilt direction C (the opposite edges in the axial direction X). Thus, the tilt groove 32 prevents the first moving member 43 from running idle.

The pair of second pressing surfaces 55 of the second pressing portion 52 of the first moving member 43 is located on the left side Y2 of the left side surface (peripheral portion of the tilt groove 32) of the side plate 30 of the upper bracket 6 on the left side Y2, and is in contact with the left side surface.

A nut 44 is attached in the threaded groove 40C of the rotating shaft 40. Between the nut 44 and the side plate 30 on the right side, the second moving member 45, the needle roller bearing 46, and the thrust washer 47 are disposed in this order from the lefts side Y2.

The second moving member 45 is substantially the same as the first moving member 43 in shape, and the shape of the second moving member 45 is equal to a shape resulting from inversion of the first moving member 43 across the reference plane 3D. Specifically, the portions of the second moving member 45 are obtained such that the portions of the first moving member 43 are moved to the opposite side across the reference plane 3D and that the first and second moving members 43 and 45 are mirror images of each other. However, unlike the first moving member 43, the second moving member 45 has no cam protrusions 56 formed thereon.

The rotating shaft 40 is inserted through the second moving member 45, the needle roller bearing 46, and the thrust washer 47.

The boss portion 53 of the second moving member 45 is inserted through the tilt groove 32 on the right side Y1. The rotating shaft 40 supports the second moving member 45 such that the second moving member 45 is relatively rotatable with the rotating shaft 40. As described above, the surfaces 53A of the boss portion 53 function as width across flats and extend along the edges of the tilt groove 32 extending in the tilt direction C. Thus, the second moving member 45 is prevented from rotating in the tilt groove 32 on the right side Y1. The pair of second pressing surfaces 55 of the second moving member 45 is located on the right side Y1 of the right side surface (peripheral portion of the tilt groove 32) of the side plate 30 of the upper bracket 6 on the right side Y1, and is in contact with the right side surface.

The rotating shaft 40 can move in the tilt direction C in each of the tilt grooves 32 of the upper bracket 6 but does not move relative to the shaft insertion holes 35 in the axial direction X or the tilt direction C. When the driver moves the steering member 11 in the tilt direction C for the tilt adjustment, the column jacket 4 as a whole is tilted relative to the upper bracket 6 as described above. At this time, the rotating shaft 40 inserted through the shaft insertion holes 35 moves in the tilt direction C along with the column jacket 4. The tilt adjustment of the steering member 11 is performed within a range where the boss portions 53 of the first moving member 43 and the second moving member 45 can move in the tilt grooves 32.

When a user such as the driver pivots the operation member 41 after performing the telescopic adjustment or the tilt adjustment, the cam 42 rotates, and the cam protrusions 56 formed on the cam 42 and the cam protrusions 56 formed on the first moving member 43 move onto each other. Consequently, the first moving member 43 moves toward the right side Y1, that is, toward the upper bracket 6, along the central axis 40A of the rotating shaft 40. The second pressing surfaces 55 of the first moving member 43 are pressed against the left side surface of the side plate 30 on the left side Y2. In conjunction with this, the second moving member 45 moves in such a way as to be attracted to the left side Y2, that is, toward the upper bracket 6, and the second pressing surfaces 55 are pressed against the right side surface of the side plate 30 on the right side Y1.

The first moving member 43 and the second pressing surfaces 55 of the second moving member 45 are positioned close to the insertion holes 51A through which the rotating shaft 40 is inserted (see FIG. 4). Thus, the first moving member 43 and the second moving member 45 can be restrained from being deformed by the reaction force to which the first moving member 43 and the second moving member 45 are subjected as a result of tightening of the side plates 30.

As described above, the first moving member 43 and the second moving member 45 move in the lateral direction Y relative to the side plates 30 of the upper bracket 6 in accordance with an operation of the operation member 41. Consequently, the side plates 30 are tightened between the first moving member 43 and the second moving member 45 from the both sides in the lateral direction Y. Thus, the support portions 34 of the lower jacket 23 are sandwiched between the side plates 30 from the both sides in the lateral direction Y to cause a frictional force between each of the side plates 30 and the corresponding support portion 34. The frictional force locks the column jacket 4 in a position, and the steering member 11 is also locked at a position resulting from the tilt adjustment and cannot move in the tilt direction C.

Furthermore, the pair of support portions 34 of the lower jacket 23 is sandwiched between the side plates 30 to reduce the distance between the support portions 34. This narrows an inner peripheral portion of the lower jacket 23 to bring the lower jacket 23 into pressure contact with the upper jacket 22 in the lower jacket 23. As a result, a frictional force is caused between the upper jacket 22 and the lower jacket 23. The friction between the upper jacket 22 and the lower jacket 23 locks the upper jacket 22 in a position. The steering member 11 is also locked at a position resulting from the telescopic adjustment and cannot move in the axial direction X.

As described above, a state of the steering system 1 when the position of the steering member 11 is fixed in the tilt direction C and the axial direction X is referred to as a locked state.

In the steering system 1 in the locked state, pivoting the operation member 41 in a direction opposite to the above-described direction rotates the cam 42 with respect to the first moving member 43. The first moving member 43 moves toward the left side Y2 along the axial direction of the rotating shaft 40. The second moving member 45 moves toward the right side Y1 along the axial direction. The side plates 30 are thus not tightened between the first moving member 43 and the second moving member 45. This eliminates the frictional force between each side plate 30 and the corresponding support portion 34 and the frictional force between the lower jacket 23 and the upper jacket 22, allowing the steering member 11 to move in the axial direction X and the tilt direction C. As described above, operating the operation member 41 enables the telescopic adjustment or the tilt adjustment of the steering member 11 again. In other words, the operation member 41 is operated for the telescopic adjustment or the tilt adjustment.

Thus, the state of the steering system 1 when the steering member 11 is not locked in a position in the tilt direction C and the axial direction X is referred to as a released state.

As seen in FIG. 1, the telescopic lock mechanism 8 is a mechanism configured to firmly lock the upper jacket 22 in a position with respect to the lower jacket 23 in the axial direction X through meshing of the teeth and to release the upper jacket 22. The telescopic lock mechanism 8 includes a tubular lock member 57, a transmission member 58, and a lock plate 59 extending in the axial direction X.

As seen in FIG. 3, the tilt lock mechanism 9 is a mechanism configured to lock the column jacket 4 in a position in the tilt direction C and to release the column jacket 4.

The tilt lock mechanism 9 is provided around each of the side plates 30. The tilt lock mechanism 9 on the left side Y2 includes the above-described first moving member 43, tooth engagement portions 65 formed in the side plate 30 on the left side Y2, a tooth member 66, an elastic member 67, and a spacer 68.

As seen in FIG. 4, a pair of the tooth engagement portions 65 is formed integrally with the side plate 30 on the left side Y2 by extrusion or the like, and protrudes from a left side surface of the side plate 30 on the left side Y2 toward the left side Y2. Thus, the tooth engagement portions 65 are positioned on the back of the side plate 30 on the left side Y2. The tooth engagement portions 65 are provided such that the tilt groove 32 is sandwiched between the tooth engagement portions 65 from both in the axial direction X.

Figure 5:
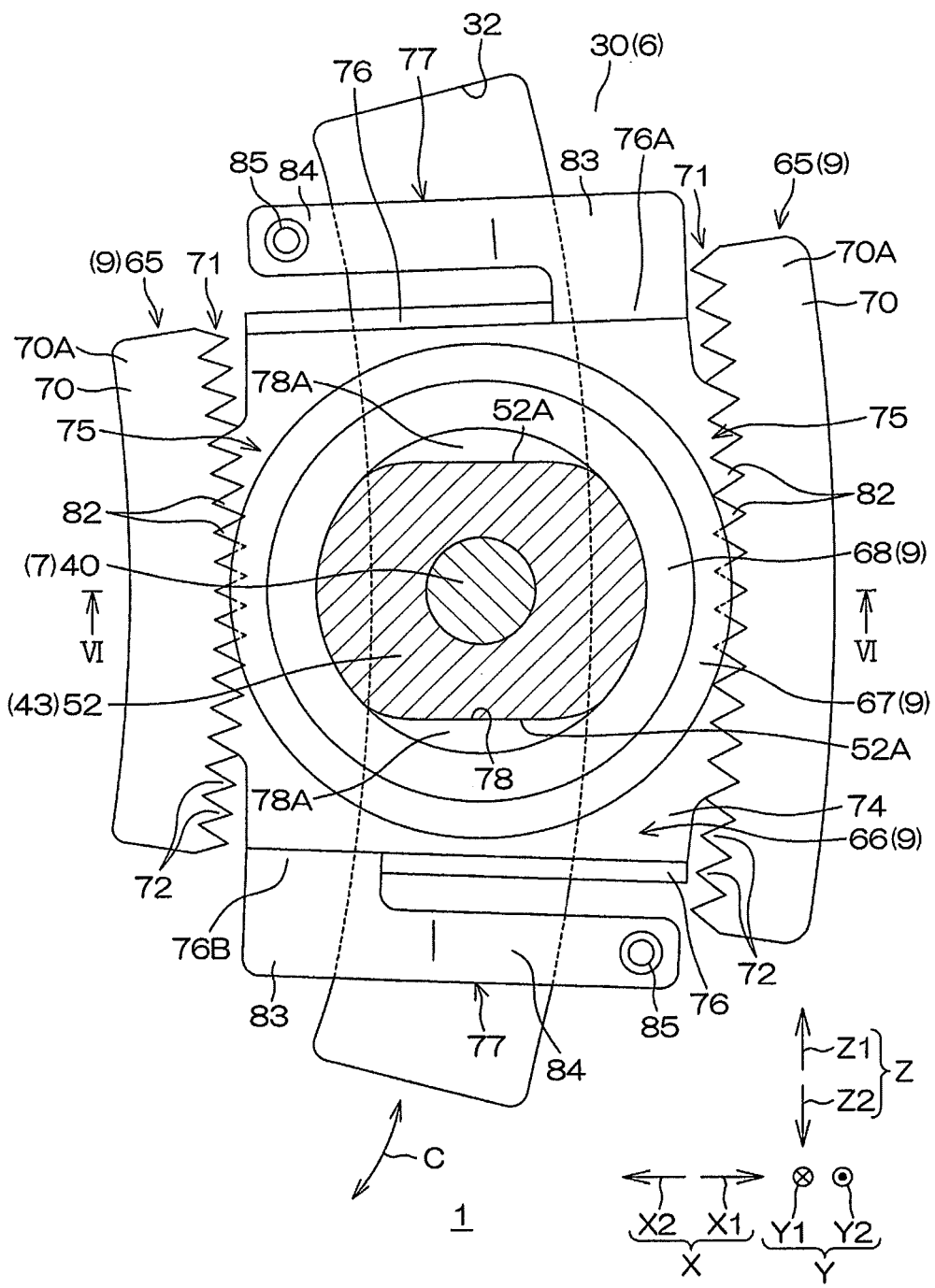
FIG. 5 is a sectional view taken along line V-V in FIG. 3.
Figure 6:
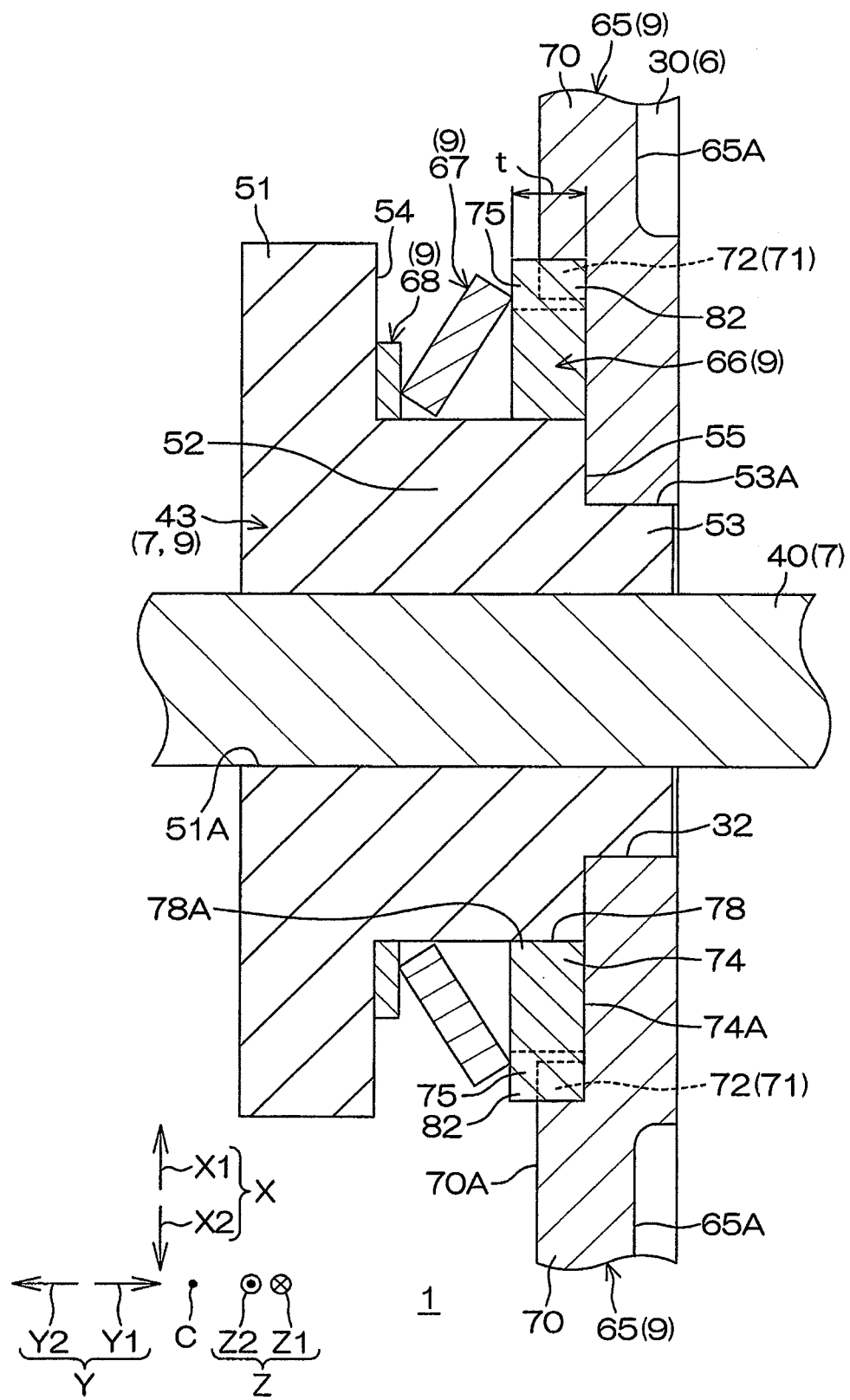
FIG. 6 is a sectional view taken along line VI-VI in FIG. 5.

FIG. 5 is a sectional view taken along line V-V in FIG. 3. FIG. 6 is a sectional view taken along line VI-VI in FIG. 5.

As seen in FIG. 5, the tooth engagement portions 65 each integrally have a holding portion 70 shaped generally like a rectangle and extending along the tilt direction C and a first tooth rows 71 protruding from the holding portion 70 toward the tilt groove 32 in the axial direction X.

At a left end of the holding portion 70, an engaged surface 70A is formed which is flat in the axial direction X and the tilt direction C.

The first tooth row 71 on the rear side X1 and the first tooth row 71 on the front side X2 face each other in the axial direction. Each of the first tooth rows 71 includes a plurality of first teeth 72 arranged at regular intervals along the tilt direction C. Each of the first teeth 72 has a tip facing the tilt groove 32 in the axial direction X. More specifically, the first teeth 72 in the first tooth row 71 on the rear side X1 have tips facing the front side X2. The first teeth 72 in the first tooth row 71 on the front side X2 have tips facing the rear side X1. A left end surface of each of the first teeth 72 is a part of the engaged surface of the holding portion 70.

As seen in FIG. 4, the tooth engagement portions 65 are each formed by, for example, extrusion toward the left side Y2. Thus, a recess 65A slightly smaller than the tooth engagement portion 65 is formed in a right side surface of the side plate 30 on the left side Y2.

The tooth member 66 is obtained by processing a single metal plate with a plate thickness t using press molding or the like, and is rigid. The tooth member 66 integrally includes a body portion 74, a pair of second tooth rows 75, a pair of ribs 76 and a pair of spring portions 77.

The body portion 74 is shaped generally like a rectangle that is thin in the lateral direction Y and that extends in the tilt direction C. A right side surface of the body portion 74 is hereinafter referred to as an engaging surface 74A. The engaging surface 74A is flat in the axial direction X and the tilt direction C.

Substantially in the center of the body portion 74 in the axial direction X and the up-down direction Z, a through-hole 78 is formed which penetrates the body portion 74 in the lateral direction Y. The through-hole 78 is generally circular as viewed in the lateral direction Y. Opposite ends in the up-down direction Z located in peripheral edges 78A defining the through-hole 78 in the body portion 74 are parallel to the flat surfaces 52A of the second pressing portion 52 of the first moving member 43. The peripheral edges 78A substantially align with an outer peripheral surface of the second pressing portion 52 of the first moving member 43 as viewed from the left side Y2 (see FIG. 5).

The second tooth rows 75 protrude outward from both edges of the body portion 74 in the axial direction X. Each of the second tooth rows 75 includes a plurality of second teeth 82 arranged at regular intervals along the tilt direction C. A left end surface of each of the second teeth 82 is a part of a left end surface of the body portion 74. A right end surface of each of the second teeth 82 is a part of a right end surface of the engaging surface 74A of the body portion 74 (see FIG. 6).

As seen in FIG. 4, the ribs 76 are formed by folding both ends of the main body portion 74 in the up-down direction Z, to the left side Y2. Thus, the ribs 76 are thin in the up-down direction Z and extend along the axial direction X. The ribs 76 reinforce the body portion 74.

As seen in FIG. 5, the spring portions 77 protrude in the same direction in the lateral direction Y (toward the right side Y1) from a rear end 76A of the rib 76 on the upper side Z1 and from a front end 76B of the rib 76 on the lower side Z2 so as to extend away from the body portion 74 in the up-down direction Z. Each of the spring portions 77 has a support portion 83 protruding from the rib 76 so as to extend away from the body portion 74 in the up-down direction Z and a deformation portion 84 that is supported by the support portion 83 and that can be elastically deformed in the lateral direction Y.

As seen in FIG. 4, the support portion 83 is shaped like a plate that is thin in the lateral direction Y. The support portion 83 of the spring portion 77 on the upper side Z1 extends from the rear end 76A of the rib 76 on the upper side Z1 toward the upper side Z1. The support portion 83 of the spring portion 77 on the lower side Z2 extends from the front end 76B of the rib 76 on the lower side Z2 toward the lower side Z2.

The deformation portion 84 of the spring portion 77 on the upper side Z1 is thin in the lateral direction Y and extends from a front end of the support portion 83 on the upper side Z1 toward the front side X2 and the right side Y1. The deformation portion 84 of the spring portion 77 on the lower side Z2 is thin in the lateral direction Y and extends from a rear end of the support portion 83 on the lower side Z2 toward the rear side X1 and the right side Y1.

At a tip portion of each of the deformation portions 84, a contact portion 85 is formed. The portion is formed by pushing the tip portion toward the right side Y1 by press molding. The contact portion 85 is shaped generally like a circle as viewed from the right side Y1.

The tooth member 66 is disposed between the first pressing portion 51 of the first moving member 43 and the side plate 30 on the left side Y2 so as to be on the left side Y2 of the side plate 30 on the left side Y2. In other words, the first pressing portion 51 of the first moving member 43 is disposed on the opposite side (on the left side Y2) of the tooth member 66 from the side plate 30 on the left side Y2.

As seen in FIG. 6, the second pressing portion 52 of the first moving member 43 is inserted through the through-hole 78 of the tooth member 66. In this state, the tooth member 66 can move in the lateral direction Y. As described above, the peripheral edges 78A of the body portion 74 defining the through-hole 78 substantially aligns with the outer peripheral surface of the second pressing portion 52 of the first moving member 43 as viewed from the right side Y1 (see FIG. 5). Thus, rotation of the tooth member 66 relative to the first moving member 43 is regulated.

In the tooth member 66, the engaging surface 74A of the body portion 74 provided with the second tooth rows 75 faces the engaged surface 70A of the first tooth row 71 in the lateral direction Y (see FIG. 4). The second tooth rows 75 are positioned to overlap the respective first tooth rows 71 of the side plate 30 in the axial direction X.

The contact portion 85 of each spring portion 77 of the tooth member 66 is located on the left side Y2 of the left side surface of the side plate 30 on the left side Y2 (see FIG. 4). In this state, the deformation portion 84 of each spring portion 77 has been deformed in the lateral direction Y to exert a force that allows the deformation portion 84 to return to a non-deformed state, that is, a restoration force.

The elastic member 67 is, for example, a disc spring. The elastic member 67 is shaped generally like a ring that fans out in a radial direction of the rotating shaft 40 toward the right side Y1. As seen in FIG. 6, a section of the elastic member 67 taken along a surface orthogonal to a circumferential direction of the rotating shaft 40 is shaped like a truncated chevron inclined counterclockwise at an angle of 90°. The elastic member 67 can exert a restoration force F that allows the elastic member 67 to return to the non-deformed state when compressed in the lateral direction Y.

Figure 7:
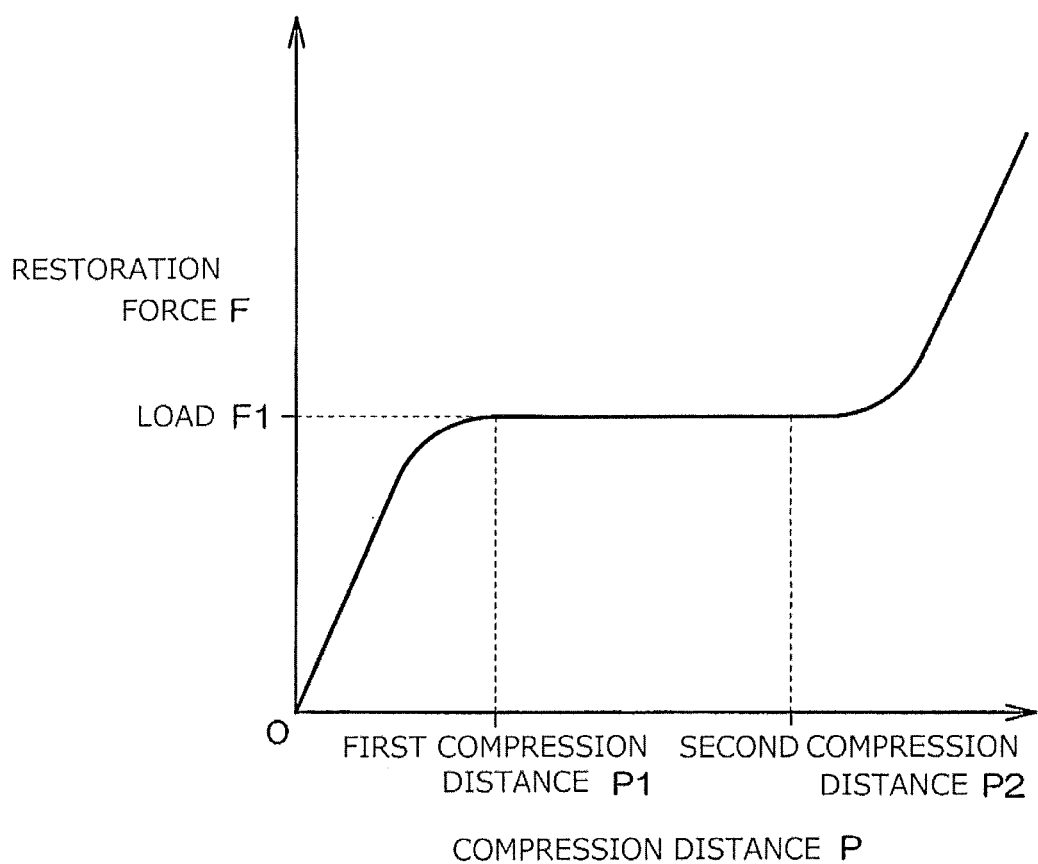
FIG. 7 is a graph illustrating the relation between a compression distance P and a restoration force F of an elastic member 67.

FIG. 7 is a graph illustrating the relation between the compression distance P and the restoration force F of the elastic member 67.

As seen in FIG. 7, when the elastic member 67 that is not compressed in the lateral direction Y starts to be compressed in the lateral direction Y, the restoration force F gradually increases as the distance by which the elastic member 67 is compressed in the lateral direction Y, that is, the compression distance P increases. When the compression distance P reaches a first compression distance P1, the restoration force F of the elastic member 67 reaches a load F1. Even when the elastic member 67 is further compressed in the lateral direction Y, the restoration force F remains constant and equal to the load F1 until the compression distance P reaches a second compression distance P2. When the compression distance P exceeds the second compression distance P2, the restoration force F starts to increase again. The restoration force F of the elastic member 67 is higher than the restoration force of the deformation portions 84 of the tooth member 66. In this manner, the elastic member 67 enables a constant restoration force F to be exerted within the predetermined range between the second compression distance P2 and the first compression distance P1.

When the elastic member 67 is a disc spring, the load F1 at which the restoration force F remains constant and the first and second compression distances P1 and P2 of the compression distance P can be adjusted by, for example, regulating the warpage or plate thickness of the elastic member 67. In the present embodiment, the elastic member 67 is a disc spring but may be a leaf spring or any other spring. In short, the elastic member 67 should be any elastically deformable member that exerts a constant restoration force F within the predetermined range of the compression distance P.

As seen in FIG. 6, the second pressing portion 52 of the first moving member 43 is inserted through a hollow portion of the elastic member 67 from the right side Y1. The elastic member 67 is disposed between the tooth member 66 and the first pressing portion 51 of the first moving member 43. A left end inner peripheral edge of the elastic member 67 extends along a portion of the outer peripheral surface of the second pressing portion 52 that is other than the flat surfaces 52A (see also FIG. 5). A right end of the elastic member 67 is in contact with a left end surface of the body portion 74 of the tooth member 66. A part of the right end of the elastic member 67 is in contact with some of the second teeth 82 of the second tooth row 75 (see FIG. 5).

The spacer 68 is, for example, a sintered component and is shaped like a ring that is thin in the lateral direction Y (see FIG. 4). The spacer 68 is inserted on the second pressing portion 52 of the first moving member 43 from the right side Y1. An inner peripheral surface of the spacer 68 extends along portions of the outer peripheral surface of the second pressing portion 52 that are other than the flat surface 52A. The spacer 68 is disposed between the first pressing portion 51 and the elastic member 67. A left side surface of the spacer 68 is in surface contact with the first pressing surface 54 of the first pressing portion 51 of the first moving member 43 from the right side Y1. A right side surface of the spacer 68 is entirely in contact with a left end of the elastic member 67 from the left side Y2.

The tooth member 66, the elastic member 67, and the spacer 68 are inserted on the second pressing portion 52 of the first moving member 43 through which the rotating shaft 40 is inserted, and thus move in the tilt direction C in the tilt groove 32 during the tilt adjustment. As described above, during the tilt adjustment, the rotating shaft 40 inserted through the shaft insertion holes 35 moves in the tilt direction C along with the column jacket 4. Consequently, the tooth member 66, the elastic member 67, and the spacer 68 move in the tilt direction C along with the column jacket 4.

As seen in FIG. 3, the tilt lock mechanism 9 on the right side Y1 includes the second moving member 45, the tooth engagement portion 65 provided on the side plate 30 on the right side Y1, the tooth member 66, the elastic member 67, and the spacer 68. The tooth engagement portion 65, the tooth member 66, the elastic member 67, and the spacer 68 of the tilt lock mechanism 9 on the right side Y1 are obtained such that the tooth engagement portion 65, the tooth member 66, the elastic member 67, and the spacer 68 in the tilt lock mechanism 9 on the left side Y2 are moved to the opposite side across the reference plane 3D and that the components of the tilt lock mechanism 9 on the right side Y1 and those of the tilt lock mechanism 9 on the left side Y2 are mirror images of each other. In the tilt lock mechanism 9 on the right side Y1, the second moving member 45 is disposed on the opposite side (on the right side Y1 of the tooth member 66 from the side plate 30 on the right side Y1.

As seen in FIG. 6, when the steering system 1 is in the above-described locked state, in the state in FIG. 6, the first teeth 72 of each first tooth row 71 and the second teeth 82 of each second tooth row 75 are alternately arranged in the tilt direction C. Thus, the first tooth rows 71 and the second tooth rows 75 mesh with each other. The tooth members 66 are fixed to the lower jacket 23 via the first moving member 43, the second moving member 45, and the rotating shaft 40. The first tooth rows 71 are fixed to the upper bracket 6 fixed to the vehicle body 2 (see FIG. 3). Thus, movement of the column jacket 4 around the central shaft 5C of the lower bracket 5 in the tilt direction C is regulated (see FIG. 1). Therefore, in the locked state, the upper jacket 22 is more firmly locked in a position in the tilt direction C as a result of the friction between the lower jacket 23 and the pair of side plates 30 of the upper bracket 6 and the meshing between the first tooth rows 71 and the second tooth rows 75. The position of the first moving member 43 in the lateral direction Y at this time is referred to as a locked position. As described above, the tilt lock mechanism 9 is a tooth lock mechanism in which the teeth mesh with one another to firmly hold the column jacket 4 in position.

In the locked state, the deformation portions 84 of the spring portions 77 of the tooth member 66 are pressed against the side plate 30 and elastically deformed in the lateral direction Y. Thus, the tooth member 66 as a whole is biased toward the elastic member 67 by the restoration force of the deformation portions 84. The elastic member 67 is compressed in the lateral direction Y to exert the restoration force F equal to the load F1.

Now, an operation of the tilt lock mechanism 9 will be described which is performed to switch the steering system 1 from the locked state to the released state. In the description below, the operation of the tilt lock mechanism 9 on the left side Y2 will be focused on. The operation of the tilt lock mechanism 9 on the right side Y1 is similar to the operation of the tilt lock mechanism 9 on the left side Y2 because the operation of the tilt lock mechanism 9 on the right side Y1 is the mirror-reversed operation of the tilt lock mechanism 9 on the left side Y2, and will thus not be described below.

Figure 8:
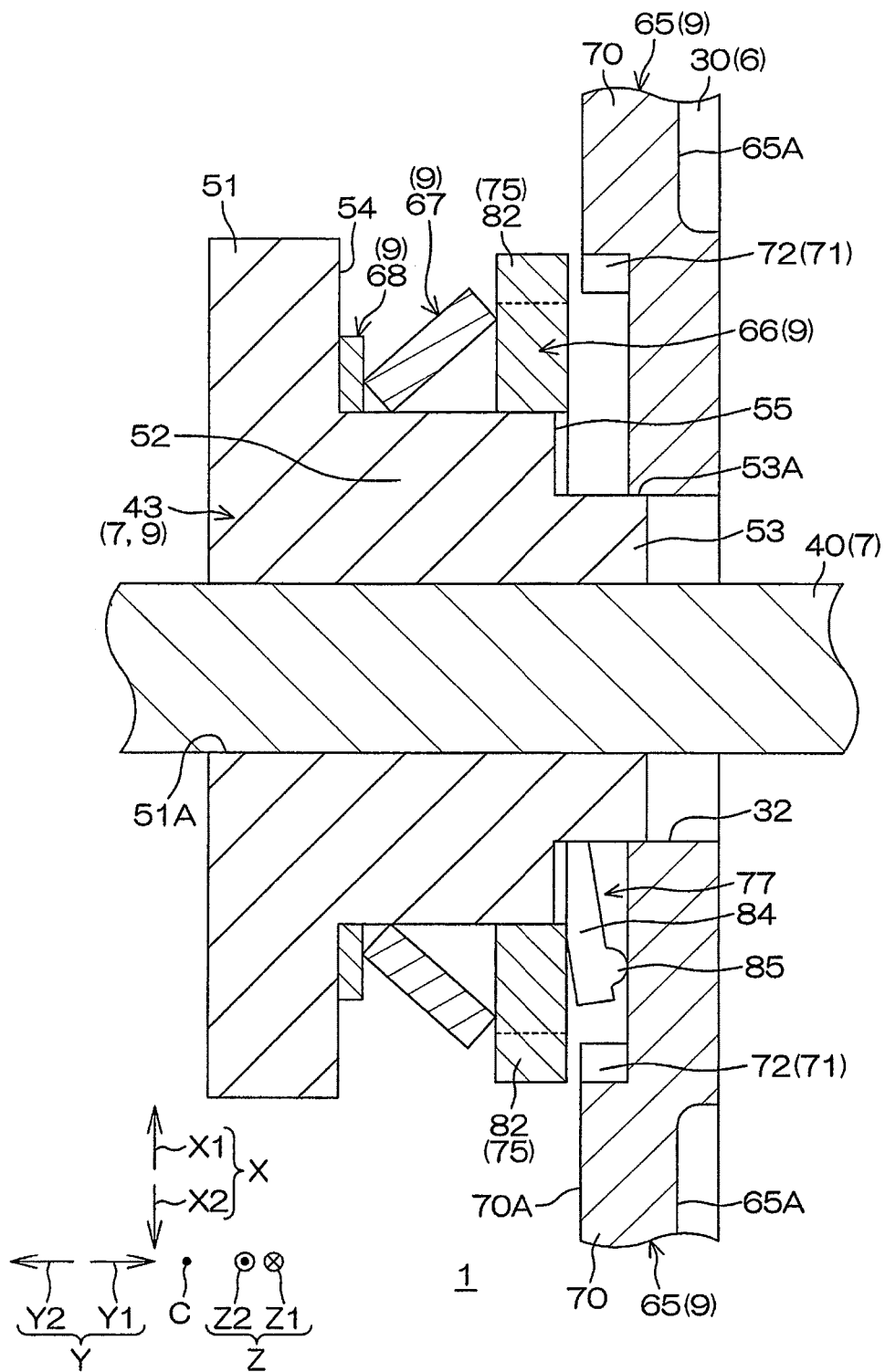
FIG. 8 is a diagram illustrating a released state of the steering system 1 in FIG. 6.

For convenience of description, FIG. 8 is also referred to which depicts the released state of the steering system 1.

When the operation member 41 (see FIG. 3) is operated to set the steering system 1 to the released state, the first moving member 43 moves from the locked position toward the left side Y2.

The compression distance P of the elastic member 67 in the lateral direction Y gradually decreases in conjunction with movement of the first moving member 43 toward the left side Y2. Before the steering system 1 is completely set to the released state, the elastic member 67 is set to an uncompressed state.

The spacer 68 is biased toward the left side Y2 by the restoration force F of the elastic member 67. Thus, the spacer 68 moves toward the left side Y2 in contact with the first pressing surface 54 of the first moving member 43 while the first moving member 43 is moving toward the left side Y2.

As described above, since the deformation portions 84 of the spring portions 77 of the tooth member 66 are elastically deformed in the lateral direction Y, the tooth member 66 as a whole is biased toward the left side Y2 by the restoration force F of the deformation portion 84. The restoration force of the deformation portions 84 are negligibly small compared with the restoration force F. Thus, when the elastic member 67 is set to the uncompressed state while the steering system 1 is changing from the lock state to the released state, the tooth member 66 starts to move toward the left side Y2 due to the restoration force F of the deformation portions 84. In conjunction with this, the second tooth rows 75 of the tooth member 66 start to move toward the left side Y2. In the released state, the second tooth rows 75 have moved farther toward the left side Y2 than the first tooth rows 71, and the meshing between the second tooth rows 75 and the first tooth rows 71 has been released. The position of the first moving member 43 in the lateral direction Y at this time is referred to as a released position.

As described above, the frictional force caused between the side plates 30 of the upper bracket 6 and the support portions 34 of the lower jacket 23 is also eliminated in the released state. Thus, in the released state, the lock of the steering member 11 in a position in the tilt direction C is completely released, which allows the tilt adjustment of the steering member 11.

Now, an operation of the tilt lock mechanism 9 on the left side Y2 will be described which is performed when the steering system 1 changes from the released state to the locked state. This operation is obtained by reversing the operation performed when the steering system 1 changes from the locked state to the released state. Since the restoration force of the deformation portions 84 are negligibly small compared with the restoration force F as described above, the restoration force of the deformation portions 84 will not be taken into account below.

When the operation member 41 (see FIG. 3) is operated to set the steering system 1 to the locked state, the first moving member 43 moves from the released state toward the right side Y1 as described above. The tooth member 66 is moved toward the right side Y1 by the first pressing portion 51 of the first moving member 43 via the spacer 68 and the elastic member 67. Consequently, the second tooth rows 75 of the tooth member 66 are positioned on the right side Y1, the first tooth rows 71 and the second tooth rows 75 mesh with each other, and the engaging surface 74A of the body portion 74 of the tooth member 66 comes into contact with the left side surface of the side plate 30 on the left side Y2, as depicted in FIG. 5 and FIG. 6.

Figure 9:
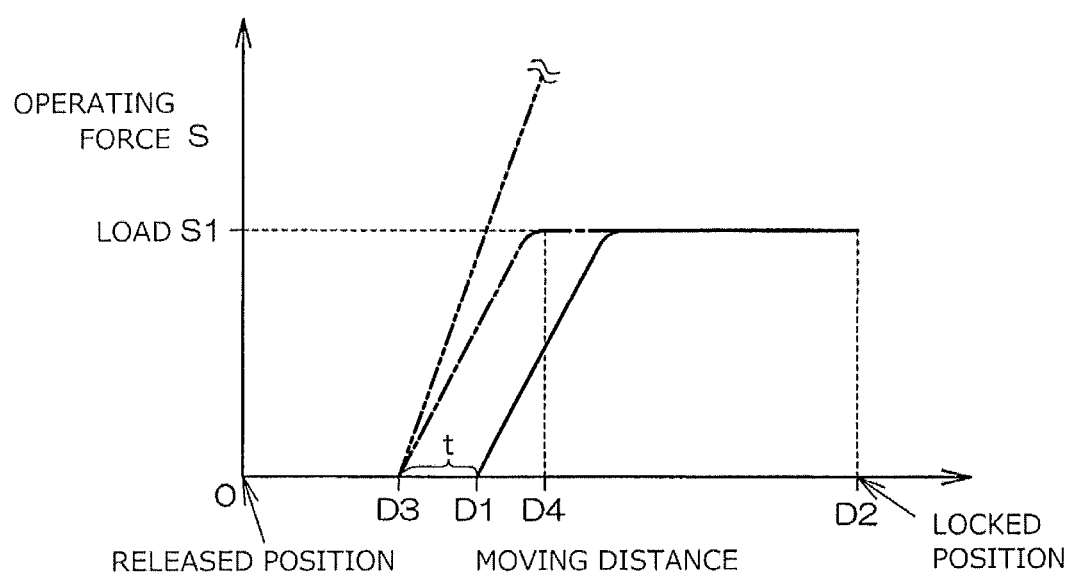
FIG. 9 is a graph illustrating the relation between a moving distance of a first moving member 43 and an operating force S exerted on an operation member 41.

FIG. 9 is a graph illustrating the relation between the moving distance of the first moving member 43 and the operating force S exerted on the operation member 41.

As seen in FIG. 9, an operating force S exerted on the operation member 41 does not substantially increase before the second tooth rows 75 of the tooth member 66 mesh with the first tooth rows 71.

After the second tooth rows 75 of the tooth member 66 mesh with the first tooth rows 71, the first moving member 43 moves toward the right side Y1 while compressing the elastic member 67 in the lateral direction Y. When the first moving member 43 starts to compress the elastic member 67, the restoration force F (see FIG. 7) of the elastic member 67 in the lateral direction Y gradually increases. Consequently, a force transmitted from the elastic member 67 to the operation member 41 via the first moving member 43 also gradually increases. Thus, the force needed to operate the operation member 41, that is, the operating force S, gradually increases. Reference character D1 is used to denote the moving distance of the first moving member 43 from the released position to the position where the operating force S starts to increase. Reference character D2 is used to denote the moving distance of the first moving member 43 from the released position to the locked position.

As described above, when the compression distance P of the elastic member 67 reaches the first compression distance P1, the restoration force F of the elastic member 67 becomes constant and equal to the load F1 (see FIG. 7). A difference between the moving distance D1 and the moving distance D2 is smaller than the difference between the first compression distance P1 and the second compression distance P2 of the compression distance P of the elastic member 67. Thus, the restoration force F of the elastic member 67 in the lateral direction Y is constant within a predetermined range where the first moving member 43 moves toward the right side Y1 between the position where the compression distance P reaches the first compression distance P1 and the locked position. The restoration force F acts on the operation member 41 as a constant reaction force. Therefore, while the first moving member 43 is moving within the predetermined range, the operating force S exerted to operate the operation member 41 remains constant and equal to a load S1.

The spacer 68 is biased toward the left side Y2 by the restoration force F of the elastic member 67. Thus, while the first moving member 43 is moving toward the right side Y1, the spacer 68 moves toward the right side Y1 in contact with the first pressing surface 54 of the first moving member 43.

Now, a case is assumed where, after performing the tilt adjustment, the user operates the operation member 41 with the first teeth 72 overlapping the second teeth 82 in the tilt direction C.

Figure 10:
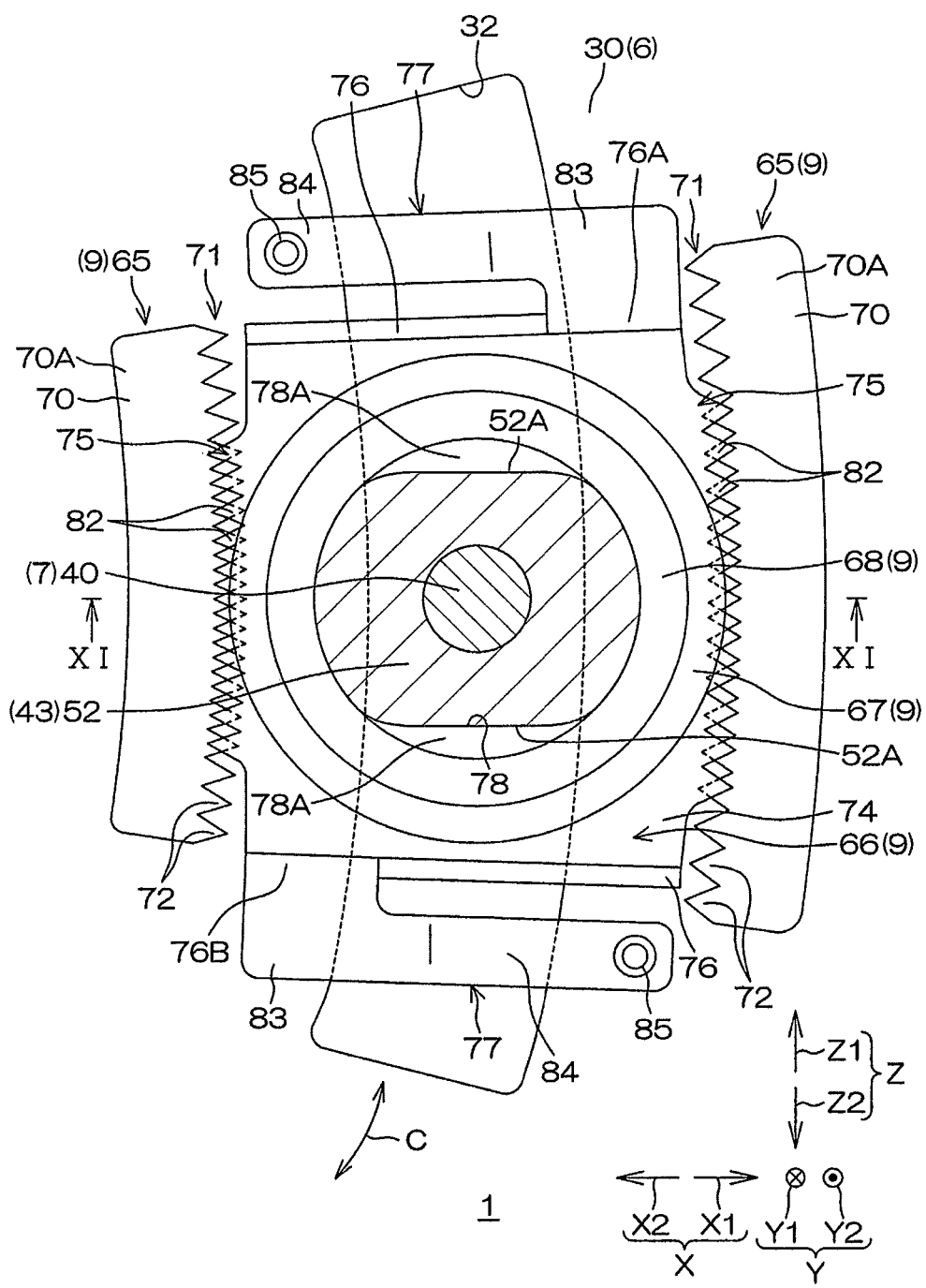
FIG. 10 is a diagram depicting second tooth rows 75 having moved onto first tooth rows 71 in FIG. 5.
Figure 11:
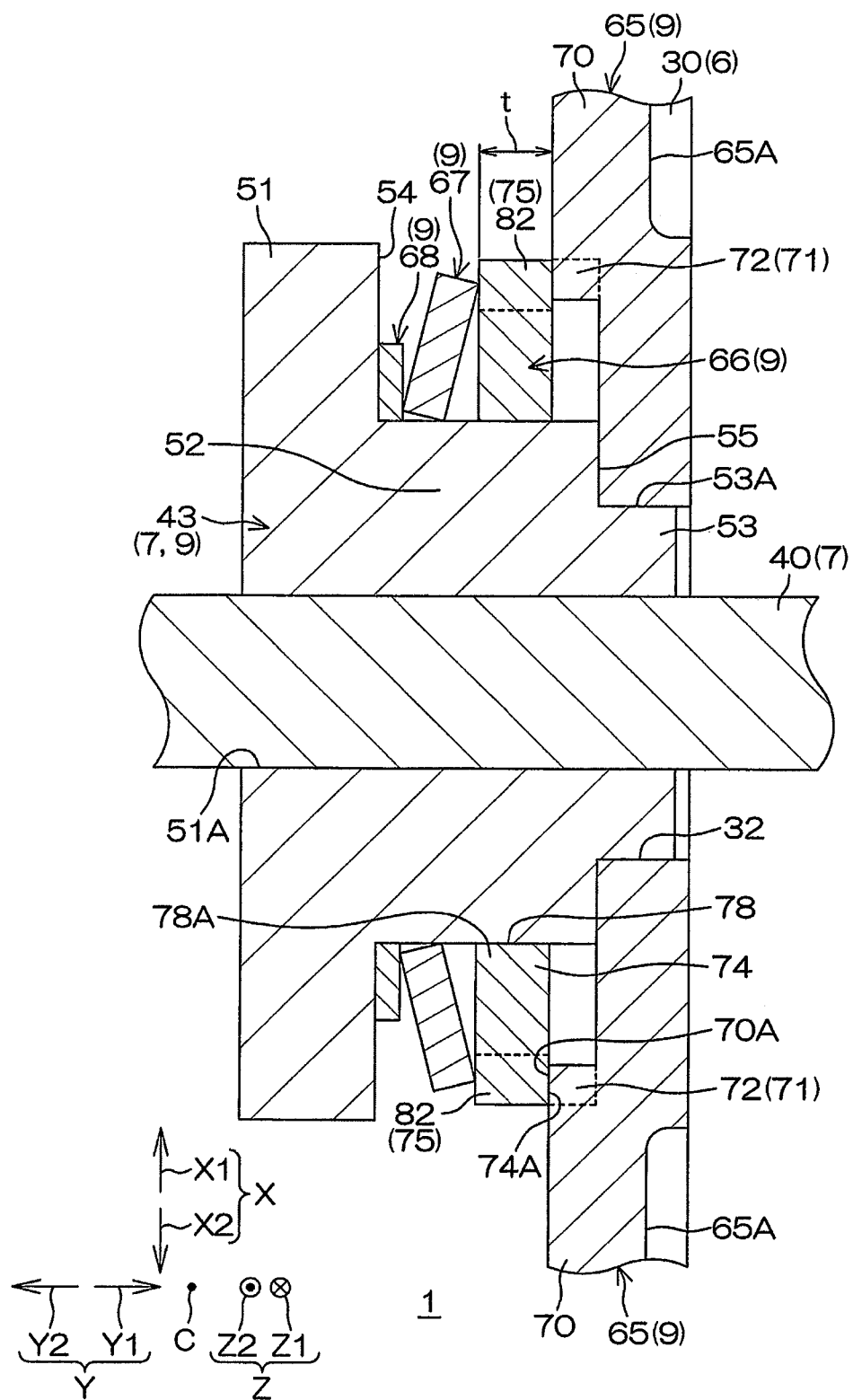
FIG. 11 is a sectional view taken along line XI-XI in FIG. 10.

FIG. 10 is a diagram depicting the second tooth rows 75 having moved onto the first tooth rows 71 in FIG. 5. FIG. 11 is a sectional view taken along line XI-XI in FIG. 10.

As seen in FIG. 10, in this case as described above, the first moving member 43 moves the tooth member 66 toward the right side Y1 via the spacer 68 and the elastic member 67.

As seen in FIG. 11, since the first teeth 72 does not overlap the second teeth 82 in the tilt direction C, the engaging surface 74A of the second tooth row 75 and the engaged surface 70A of the first tooth rows 71 come into contact with each other in the lateral direction Y. Consequently, what is called half lock occurs in which the first tooth rows 71 and the second tooth row 75 fail to mesh with each other and the second tooth rows 75 move onto the first tooth rows 71. A state of the steering system 1 where the half lock occurs is referred to as a half locked state. In the half locked state, the second tooth rows 75 have moved onto the first tooth row 71, and thus, the distance between the tooth member 66 and the first moving member 43 in the half locked state is shorter than that in a non-half-locked state by a value equal to the plate thickness t of the body portion 74 of the tooth member 66.

In the half locked state, the frictional force caused by the positioning mechanism 7 (see FIG. 1) locks the column jacket 4 in a position, and the steering member 11 is locked at the position resulting from the tilt adjustment and cannot move in the tilt direction C, as in the locked state.

As seen in FIG. 3, the positioning mechanism 7 and the tilt lock mechanisms 9 allow the column jacket 4 to be locked in a position regardless of whether or not the first tooth rows 71 and the second tooth rows 75 mesh with each other. In other words, the tilt adjustment can be achieved in a stepless manner within the range where the first moving member 43 and the second moving member 45 can move in the tilt grooves 32.

Now, an operation of the tilt lock mechanism 9 on the left side Y2 will be described which is performed when the steering system 1 changes from the released state to the half locked state.

As illustrated in a graph of a long dashed short dashed line in FIG. 9, the elastic member 67 starts to be compressed when the first moving member 43 moves in the half locked state toward the right side Y1. Reference character D3 is used to denote the moving distance of the first moving member 43 from the released position to a position where, in the half locked state, the elastic member 67 starts to be compressed.

As described above, the distance between the tooth member and the moving member in the half locked state is shorter than that in the non-half-locked state by the value equal to the plate thickness t of the body portion 74 of the tooth member 66 (see FIG. 11). Thus, the moving distance D3 is shorter than the moving distance D1 of the first moving member 43 from the released position to a position where the operating force S starts to be increased in the case where half lock is not performed. The difference between the moving distance D1 and the moving distance D3 corresponds to the plate thickness t of the body portion 74 of the tooth member 66.

Subsequently, when the first moving member 43 starts to compress the elastic member 67, the restoration force F of the elastic member 67 in the lateral direction Y gradually increases, and thus the operating force S exerted on the operation member 41 gradually increases.

As described above, when the compression distance P of the elastic member 67 reaches the first compression distance P1, the restoration force F of the elastic member 67 becomes constant and equal to the load F1 (see FIG. 7). Thus, the operating force S exerted on the operation member 41 becomes constant and equal to the load S1. Reference character D4 is used to denote the distance the first moving member 43 moves from the released position until the operating force S becomes constant in the half lock state.

A difference between the moving distance D2 and the moving distance D4 is smaller than the difference between the first compression distance P1 and the second compression distance P2 of the compression distance P of the elastic member 67. Thus, the restoration force F of the elastic member 67 in the lateral direction Y is constant within a predetermined range where the first moving member 43 moves toward the right side Y1 between a position away from the released position by the distance D4 toward the right side Y1 and the locked position. Consequently, while the first moving member 43 is moving within the predetermined range, the operating force S exerted to operate the operation member 41 remains constant and equal to the load S1.

In the half locked state, the tooth member 66 comes into contact with the side plate 30 on the left side Y2 earlier than usual, which accordingly increases the compression distance P of the elastic member 67. If the elastic member 67 is omitted unlike in the present embodiment, the operating force S continues to increase instead of remaining constant as illustrated by a long dashed double-short dashed line. Thus, although not illustrated in FIG. 9, an operating force S larger than the load S1 is needed when the first moving member 43 reaches the locked position.

However, the restoration force F exerted by the elastic member 67 remains constant and equal to the load F1. Therefore, the operating force S exerted on the operation member 41 remains constant and equal to the load S1 regardless of whether or not the first tooth rows 71 and the second tooth rows 75 mesh properly with each other. the operating force S can thus be stabilized.

Furthermore, the normal locked state and the half locked state are the same in the manner of rising of the operating force S with respect to the moving distance of the first moving member 43 and in the maximum value (load S1) of the operating force S. Consequently, the feeling experienced by the user of the vehicle in operating the operation member 41 is substantially the same in the locked state and in the half locked state.

When the elastic member 67 is a disc spring as in the present embodiment, the dimensions or the like of the elastic member 67 are adjusted to allow a constant restoration force F to be exerted while the first moving member 43 is moving within the predetermined range.

Figure 12A:
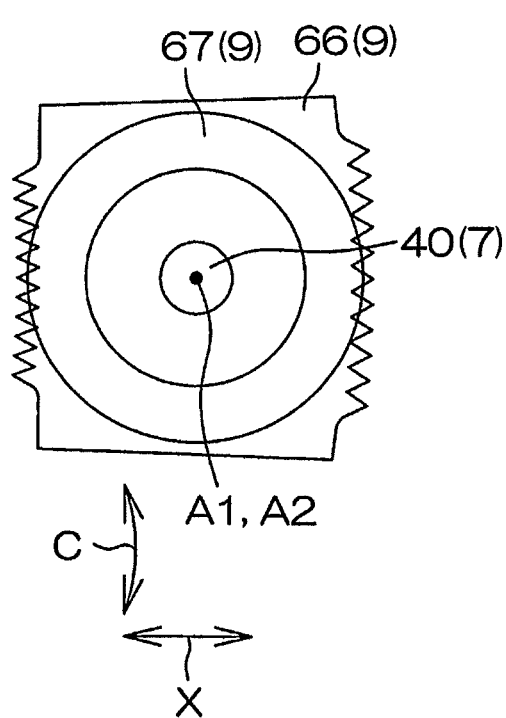
FIG. 12A is a diagram schematically illustrating the positional relation between the elastic member 67 and a tooth member 66.
Figure 12B:
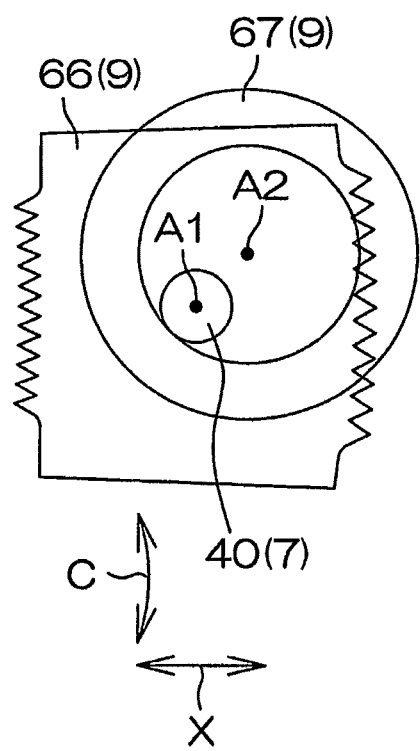
FIG. 12B is a diagram illustrating that the position of the elastic member 67 has been displaced from the position in FIG. 12A.

FIG. 12A is a diagram schematically illustrating the positional relation between the elastic member 67 and the tooth member 66. FIG. 12B is a diagram illustrating that the position of the elastic member 67 has been displaced from the position in FIG. 12A.

The tooth member 66 is rigid and has the reinforcing ribs 76, which enhance the rigidity of the tooth member 66. Consequently, the tooth member 66 is difficult to deflect wherever the tooth member 66 is subjected to the restoration force F of the elastic member 67 in the tilt direction C and the axial direction X. Thus, the restoration force F of the elastic member 67 to which the tooth member 66 is subjected remains constant even if the center of gravity A1 of the elastic member 67 overlaps the center of gravity A2 of the rotating shaft 40 in the axial direction X and the tilt direction C as viewed in the lateral direction Y as illustrated in FIG. 12A or the center of gravity A1 and the center of gravity A2 are misaligned in the axial direction X and the tilt direction C. Therefore, the operating force S exerted on the operation member 41 can be restrained from being varied by the reaction force resulting from the deflection of the tooth member 66. This also allows the operating force S exerted on the operation member 41 to be stabilized.

In the half locked state, the tooth member 66 need not be deflected. Thus, even when a part of the right end of the elastic member 67 is in contact with a part of the second tooth row 75 as depicted in FIG. 12A and FIG. 12B, the operating force S exerted on the operation member 41 remains constant.

Since a part of the right end of the elastic member 67 may come into abutting contact with some of the second teeth 82 of the second tooth row 75, the size of the elastic member 67 can be freely selected.

As seen in FIG. 1, at the time of a vehicle collision, what is called a secondary impact occurs in which the driver collides against the steering member 11. In the secondary impact, the steering member 11 is subjected to impact in the axial direction X and the tilt direction C by a reaction force resulting from deployment of an air bag or the driver's collision against the airbag. In this case, it is difficult to maintain the position of the column jacket 4 using only the frictional force caused by the positioning mechanism 7. Consequently, appropriately maintaining the position of the airbag during the secondary collision is difficult.

However, in the steering system 1 in the present embodiment, the telescopic lock mechanism 8 and the tilt lock mechanisms 9 reliably maintain the position of the column jacket 4 in the axial direction X and the tilt direction C. Therefore, the position of the airbag during the secondary impact can be appropriately maintained.

In the half locked state, the position of the column jacket 4 is maintained using only the frictional force caused by the positioning mechanism 7. Thus, if a secondary impact occurs, the column jacket 4 acts to pivot in the tilt direction C. In this case, when the column jacket 4 is pivoted in the tilt direction C by a distance equal to the half of the pitch of the first tooth rows 71 and the second tooth rows 75, the first teeth 72 of the first tooth rows 71 are arranged alternately with the second teeth 82 of the second tooth rows 75 in the tilt direction C. The tooth member 66 with the second tooth rows 75 are subjected to the restoration force F of the elastic member 67 compressed in the lateral direction Y, and thus, the tooth member 66 moves toward the upper bracket 6. This causes the first tooth rows 71 and the second tooth rows 75 to mesh with each other. Consequently, even in the half lock, the column jacket 4 can be prevented from being pivoted in the tilt direction C during the secondary impact.

Now, a variation of the present invention will be described.

Figure 13:
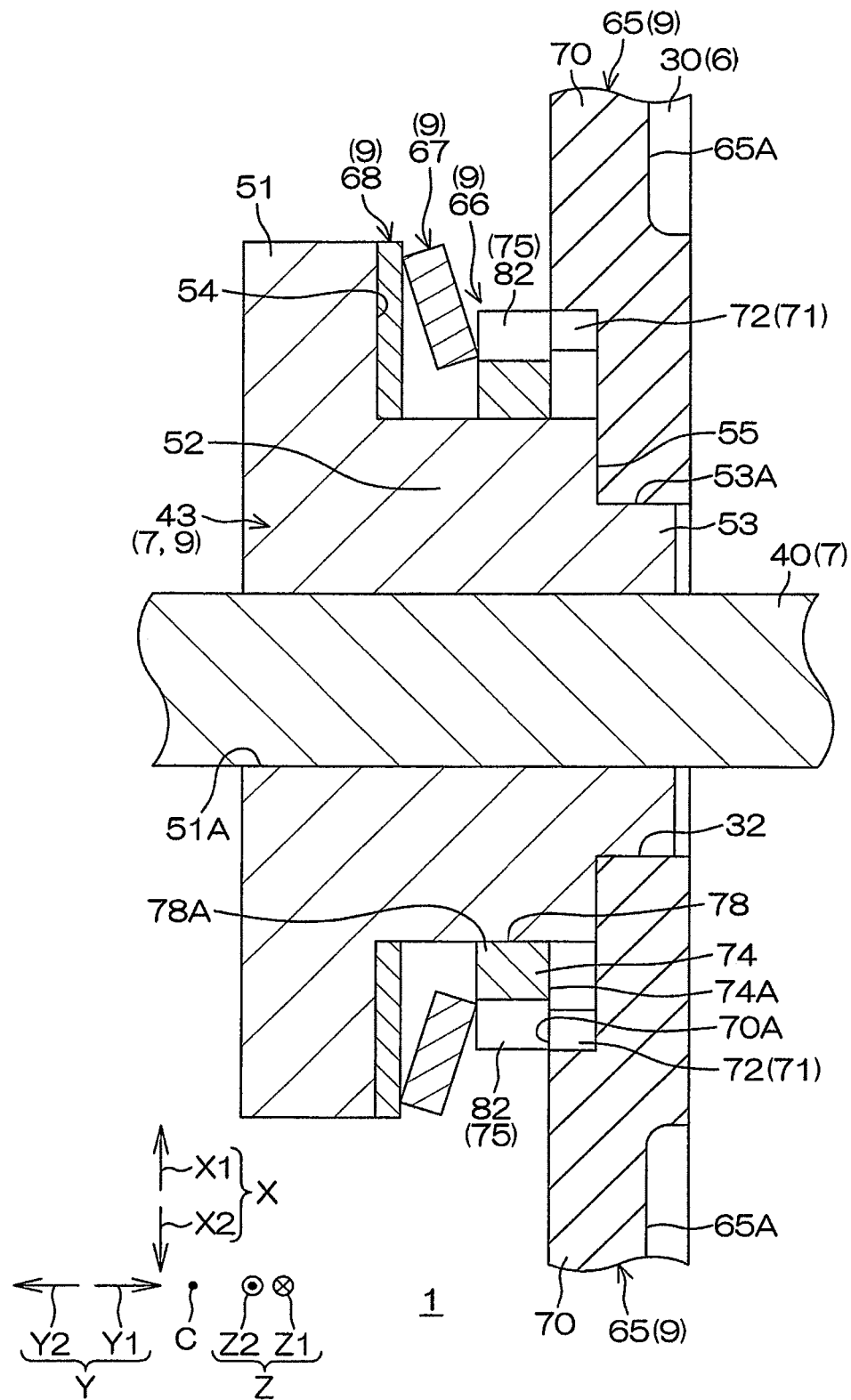
FIG. 13 is a diagram illustrating a variation of the present invention applied in FIG. 11.

FIG. 13 is a diagram illustrating the variation of the present invention applied in FIG. 11.

As seen in FIG. 13, in the variation, the elastic member 67 in the present embodiment is inverted in the lateral direction Y.

More specifically, the elastic member 67 in the variation is shaped generally like a ring that fans out in the radial direction of the rotating shaft 40 toward the left side Y2. A section of the elastic member 67 taken along a surface orthogonal to the circumferential direction of the rotating shaft 40 is shaped like a truncated chevron inclined clockwise at an angle of 90°.

The present invention is not limited to the above-described embodiment, and various changes may be made to the embodiment.

For example, unlike in the present embodiment, the tilt lock mechanism 9 may be provided on one of the right side Y1 or the left side Y2 of the upper bracket 6.

The ribs 76 of the tooth member 66 may be provided separately from the body portion 74 of the tooth member 66.

The tooth engagement portions 65 (first tooth rows 71) may be formed separately from the side plates 30. In this case, the recesses 65A are not formed in each side plates 30, and the holding portions 70 and the first tooth rows 71 of the tooth engagement portions 65 are solid, unlike in the present embodiment. In this case, the tooth engagement portions 65 are attached to the side plate 30 by welding or the like.

The steering system 1 is not limited to a manual steering system in which the operation of the steering member 11 is not assisted. The steering system 1 may be a column-assist electric power steering system 1 in which the operation of the steering member 11 is assisted by an electric motor.

The tilt lock mechanism 9 is also applicable to a steering system with no telescopic lock mechanism unlike the present embodiment.

The tilt lock mechanism 9 is also applicable to a capsule steering system 1 with a capsule (not depicted in the drawings) that couples the coupling plate 31 of the upper bracket 6 to the vehicle body 2 (see FIG. 1), unlike the present embodiment.

The ribs 76 may be omitted if the tooth member 66 can be made sufficiently rigid without the ribs 76.

What is claimed is:

1. A steering system comprising:
a steering member;
a column jacket that holds a steering shaft with the steering member coupled to one end of the steering shaft and that is movable in a tilt direction intersecting an axial direction of the steering shaft in an up-down direction in order to position the steering member in the tilt direction;
a bracket that has a surface provided with a first tooth row including a plurality of first teeth arranged along the tilt direction, and that is fixed to a vehicle body to support the column jacket;
an operation member that is operated for the positioning;
a rigid tooth member that is provided adjacent to the bracket in a direction orthogonal to both the axial direction and the tilt direction and that is movable in the tilt direction along with the column jacket and movable in the orthogonal direction;
a second tooth row that is provided on a surface of the tooth member, the tooth member surface facing the bracket surface in the orthogonal direction, and that includes a plurality of second teeth arranged along the tilt direction, the second tooth row meshing with the first tooth row when the first teeth and the second teeth are alternately arranged in the tilt direction;
a moving member that is disposed on the opposite side of the tooth member from the bracket in the orthogonal direction and that is movable in the orthogonal direction in accordance with an operation of the operation member; and
an elastic member disposed between the tooth member and the moving member such that while the moving member moves toward the bracket, the elastic member is compressed in the orthogonal direction and exerts a constant restoration force in a predetermined range, the elastic member being capable of exerting the constant restoration force over a range that is larger than a distance between a position where the moving member starts to compress the elastic member and a position where the second tooth row is meshed with the first tooth row when the first teeth and the second teeth are alternately arranged in the tilt direction.

2. The steering system according to claim 1, wherein the tooth member has a reinforcing rib.

3. The steering system according to claim 1, wherein when the first tooth row and the second tooth row are in mesh with each other, the elastic member is in contact with at least a part of the second tooth row.

4. The steering system according to claim 1, wherein the elastic member is a disc spring.

* * * * *